No. 737,255. PATENTED AUG. 25, 1903.
W. J. LLOYD.
ELECTRICAL MEASURING INSTRUMENT.
APPLICATION FILED FEB. 10, 1903.
NO MODEL.
2 SHEETS—SHEET 1.

WITNESSES:
Geo. V. Rasmussen

INVENTOR.
William J. Lloyd.
BY
his ATTORNEY.

No. 737,255. PATENTED AUG. 25, 1903.
W. J. LLOYD.
ELECTRICAL MEASURING INSTRUMENT.
APPLICATION FILED FEB. 10, 1903.
NO MODEL. 2 SHEETS—SHEET 2.

WITNESSES: INVENTOR.
William J. Lloyd.
BY
his ATTORNEYS.

No. 737,255. Patented August 25, 1903.

UNITED STATES PATENT OFFICE.

WILLIAM J. LLOYD, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

ELECTRICAL MEASURING INSTRUMENT.

SPECIFICATION forming part of Letters Patent No. 737,255, dated August 25, 1903.

Application filed February 10, 1903. Serial No. 142,776. (No model.)

*To all whom it may concern:*

Be it known that I, WILLIAM J. LLOYD, a citizen of the United States, and a resident of Pittsfield, Massachusetts, have invented certain new and useful Improvements in Electrical Measuring Instruments, of which the following is a specification.

The object of my invention is to provide an instrument for measuring electric currents that shall be suitable for both alternating and direct currents, that shall not be affected by frequency or wave form, that shall be sensitive and accurate thoughout its range, that shall be "dead-beat" in its indications, that shall allow of ready and accurate adjustment, that shall be portable, and that shall be simple and economical in construction.

Figure 1:
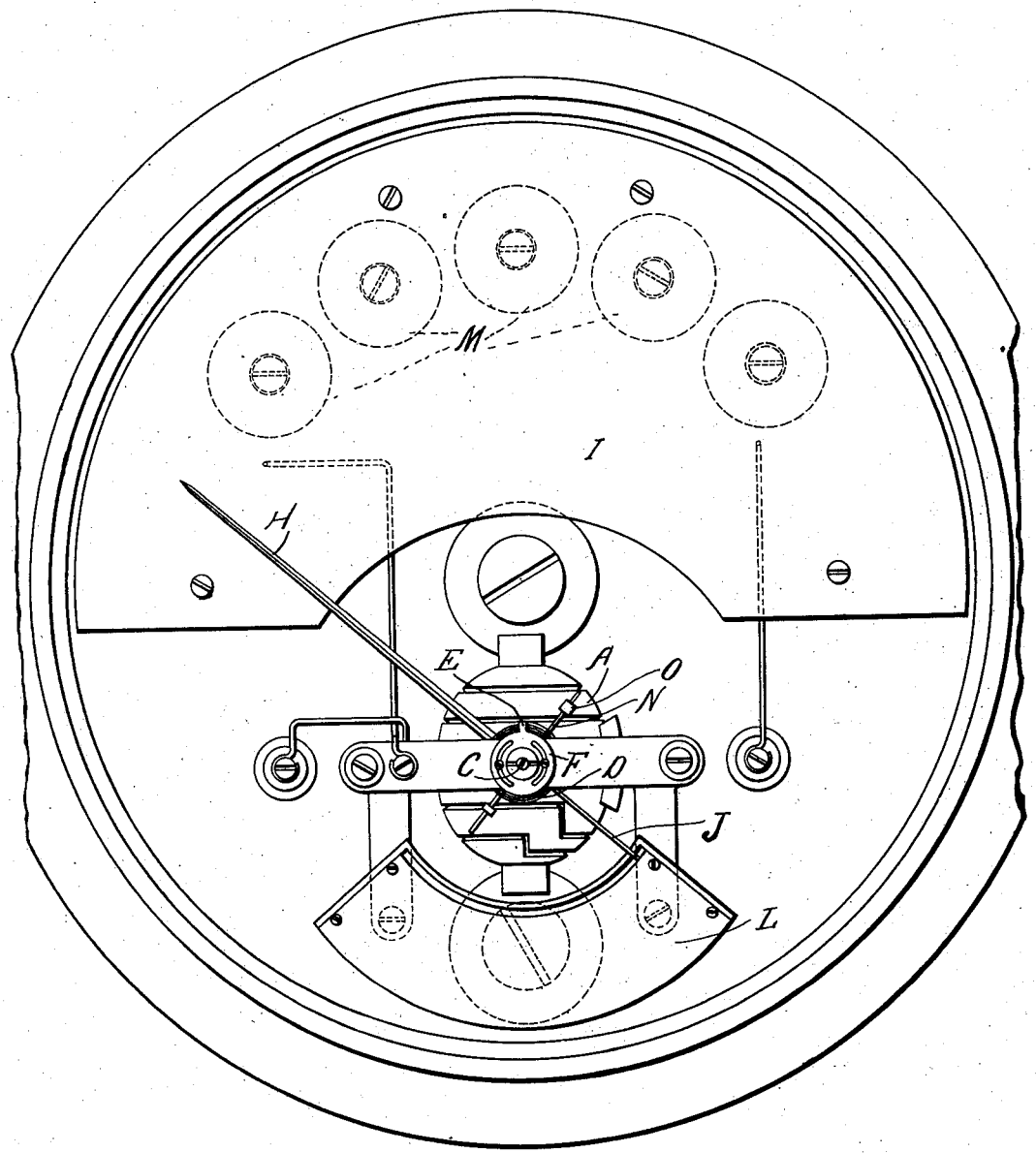
Figure 2:
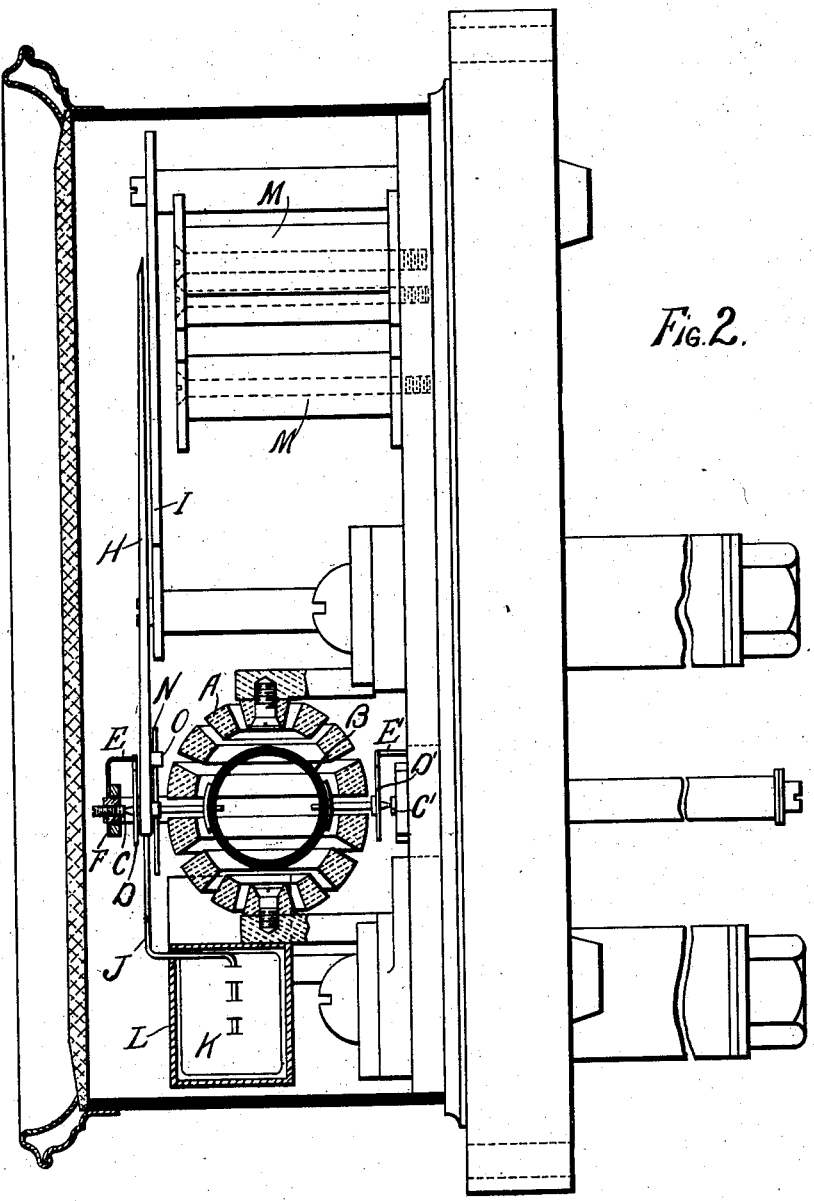

Referring to the drawings, Figure 1 is a front elevation, and Fig. 2 is a side elevation of an instrument embodying my invention.

A is a stationary coil so formed that its inner surface is practically spherical. This coil may be a casting, as indicated in the drawings, or it may be wire-wound.

B is a light annular coil rotatably mounted within the spherical interior of stationary coil A. Coil B is preferably mounted like the balance-wheel of a watch, pivoted on jewel-bearings C C' and opposed in its rotation by the spiral springs D D'. The outer ends of springs D D' are attached to arms E E', and arm E is carried by adjustable plate F, which permits adjustment of the spring tension. This method of mounting and adjustment, which is precisely similar to that employed in a watch and which needs no further description, furnishes a delicate construction and renders the instrument at the same time sensitive and portable.

Carried by the movable coil B is a light pointer H, which is adapted to move over the scale-plate I. Also carried by movable coil B is arm J, carrying at its end the vane K, which moves in chamber L as coil B rotates and acting as an air dash-pot damps the motion of coil B and renders the indications of pointer H dead-beat. Arm N and counterweight O, adjustable thereon, are also carried by movable coil B and furnish a supplementary means of adjustment of the movable coil.

The spherical chamber formed by coil A provides an intense and uniform field for all positions of coil B, and hence renders the instrument more evenly sensitive throughout its range than in former instruments. There being no iron in the magnetic circuit of either coil, the instrument is correct for alternating as well as direct current and is not affected by frequency or wave form.

The instrument is suitable for measuring many of the characteristics of electric currents. When used as a wattmeter, the stationary coil A will be connected in the line, either directly or by means of a shunt or a series transformer, while the movable coil B will be connected across the line through a non-inductive resistance or a potential transformer, or both. When a non-inductive resistance is used, it may be conveniently carried by bobbins mounted inside the case, as indicated at M M. To avoid friction due to moving contacts, springs D D' are preferably used to convey the current to movable coil B. When the instrument is used as an ammeter, both coils may be connected in the line in shunt to each other or in any of the ways well-known to those skilled in the art to whom the various uses of the instrument will be obvious.

I do not desire to limit myself to the precise construction and arrangement of parts here shown, as changes therein which do not depart from the spirit of my invention will be obvious to those skilled in the art.

I claim as new and desire to secure by these Letters Patent—

1. In an electrical measuring instrument, a stationary spherical coil, a coil rotatable therein, and means for indicating the position of the rotatable coil.

2. In an electrical measuring instrument, a stationary spherical coil, an annular coil rotatable therein, and a pointer carried by the rotatable coil.

3. In an electrical measuring instrument, a stationary spherical coil, an annular coil pivotally mounted therein and spiral springs for opposing the rotation of the annular coil.

4. In an electrical measuring instrument, a stationary spherical coil, a coil rotatable therein, spiral springs opposing the rotation of the rotatable coil, and means for indicating the position of the rotatable coil.

5. In an electrical measuring instrument, a stationary spherical coil, a coil rotatable therein, spiral springs opposing the rotation of the rotatable coil, means for damping the movement of the rotatable coil, and means for indicating the position of the rotatable coil.

6. In an electrical measuring instrument, a stationary spherical coil, an annular coil rotatable therein, spiral springs opposing the rotation of the rotatable coil, an air dash-pot damping the movement of the said coil, and a pointer for indicating the position of the said coil.

Signed at Pittsfield, Massachusetts, this 2d day of February, 1903.

W. J. LLOYD.

Witnesses:
 RICHARD EYER,
 R. E. HAYNES.